(12) United States Patent
Huang et al.

(10) Patent No.: US 7,753,675 B2
(45) Date of Patent: Jul. 13, 2010

(54) AUXILIARY POSITION APPARATUS FOR INJECTION MOLDING MACHINE

(75) Inventors: Chih-Hao Huang, Taipei Hsien (TW); Chien-Hung Liu, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 176 days.

(21) Appl. No.: 12/236,346

(22) Filed: Sep. 23, 2008

(65) Prior Publication Data

US 2010/0074985 A1 Mar. 25, 2010

(51) Int. Cl.
*B29C 45/20* (2006.01)
(52) U.S. Cl. .................. 425/542; 425/549; 425/574
(58) Field of Classification Search .............. 425/542, 425/549, 574
See application file for complete search history.

(56) References Cited

U.S. PATENT DOCUMENTS 3,600,755 A * 8/1971 Cook ..................... 425/574

\* cited by examiner

*Primary Examiner*—Tim Heitbrink
(74) *Attorney, Agent, or Firm*—WPAT, P.C.; Anthony King

(57) ABSTRACT

An auxiliary position apparatus is adapted for an injection molding machine which includes a nose and the nose has a nozzle at one end thereof. The auxiliary position apparatus includes a position device for being mounted to the nose and at least two light emitting devices adjustably mounted to the position device. The two light emitting devices can emit two adjustable light beams to focus as a light-spot which is substantially in alignment with the nozzle on a mold placed on the injection molding machine. By moving the mold to make the light-spot located at an injecting hole of the mold, the nozzle can be adjustably in alignment with the injecting hole rapidly and precisely before the injection molding operations.

11 Claims, 2 Drawing Sheets

AUXILIARY POSITION APPARATUS FOR INJECTION MOLDING MACHINE

BACKGROUND OF THE INVENTION

1. Field of the Invention

The present invention relates to an auxiliary position apparatus for injection molding machine, and more particularly to an auxiliary position apparatus for injection molding machine which can make an injecting hole of a mold aim at a nozzle of an injection molding machine precisely and rapidly.

2. The Related Art

At present, injection molding machines include two kinds of types: horizontal type and vertical type. A mold should be placed on the injection molding machine before a product is formed. Generally, the injection molding machine has a nozzle and the mold defines an injecting hole therein. When the nozzle precisely aims at the injecting hole, liquid material (e.g., plastic) flow out of the nozzle and inject into the mold along the injecting hole to finish the injection molding operation.

In order to make the nozzle and the injecting hole in alignment with each other rapidly, the mold placed on the horizontal type injection molding machine adds a locating ring thereon to achieve the purpose, while the mold is to correspondingly define a groove to install the locating ring.

However, when the mold has not a groove, it has to be done manually with a visual check in order to make the nozzle be in alignment with the injecting hole. It is not only time-consuming, but also difficult to precisely make the nozzle be in alignment with the injecting hole.

SUMMARY OF THE INVENTION

It is an object of the present invention to provide an auxiliary position apparatus for injection molding machine which can make an injecting hole of a mold aim at a nozzle of a nose of an injection molding machine precisely and rapidly. The auxiliary position apparatus includes a position device for being mounted to the nose and at least two light emitting devices adjustably mounted to the position device. The two light emitting devices can emit two adjustable light beams to focus as a light-spot which is substantially in alignment with the nozzle on the mold placed on the injection molding machine.

As described above, the light emitting devices are adjustably mounted to the position device for emitting adjustable light beams to focus as a light-spot which is substantially in alignment with the nozzle on the mold placed on the injection molding machine. By moving the mold to make the light-spot located at the injecting hole of the mold, the nozzle can be adjustably in alignment with the injecting hole rapidly and precisely.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
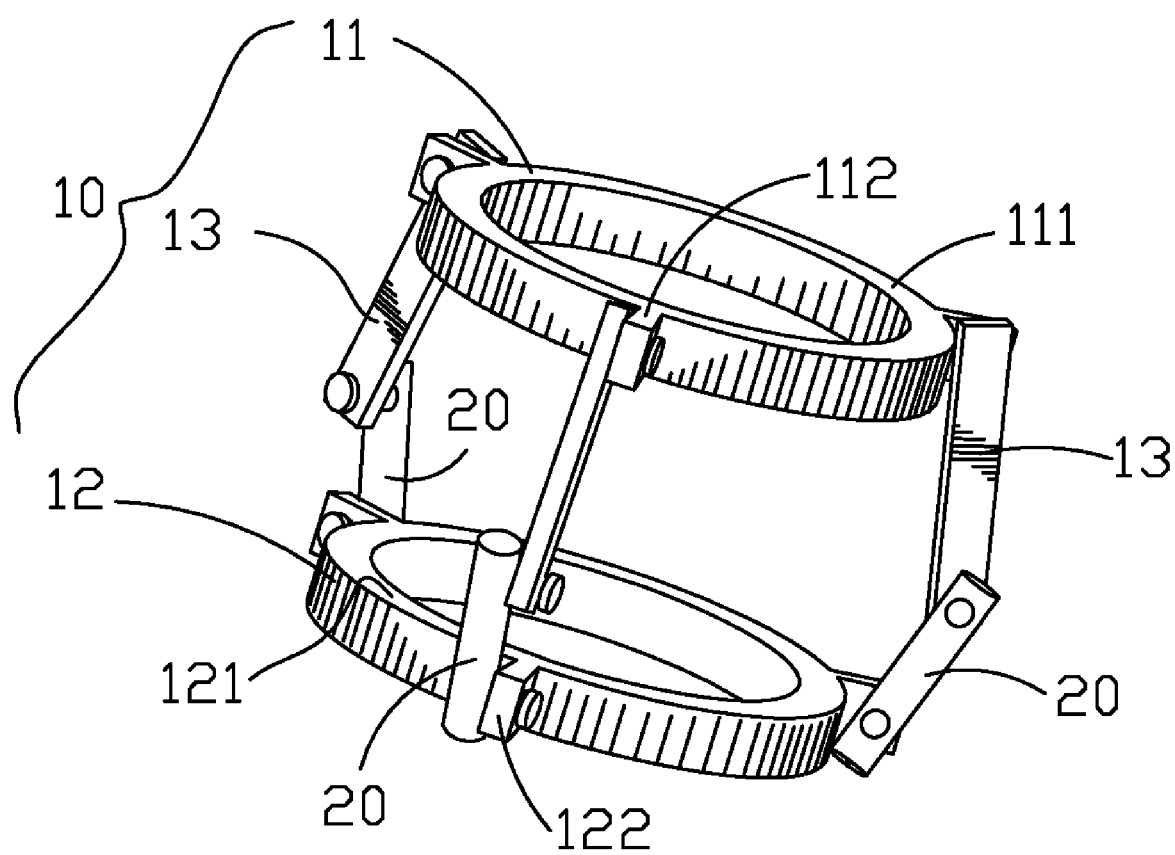
FIG. 1 is a perspective view showing an auxiliary position apparatus for injection molding machine according to the present invention.

Refer to FIG. 1, an auxiliary position apparatus for injection molding machine according to the invention is shown. The auxiliary position apparatus includes a position device 10 and three light emitting devices 20 adjustably mounted to the position device 10. The position device 10 is made of a heat-resistant material (e.g., ceramics) so that the position device 10 can work at high temperature.

The position device 10 has a first bracket 11, a second bracket 12 and three linked components 13, one end of each linked component 13 is pivotally mounted to the first bracket 11. The first bracket 11 has a circular first fixed portion 111. Three first bearing pieces 112 vertically extend out of the outer periphery of the first fixing portion 111 and are disposed in equidistance, so that two adjacent first bearing pieces 112 form an angle of 120 degrees with respect to the center of the first fixing portion 111. The second bracket 12 is the same as the first bracket 11, which has an annual second fixed portion 121 and three second bearing pieces 122 equidistantly extended outwardly from the second fixed portion 121. Both of the first and the second bearing pieces 112, 122 define pivotal holes (not labeled) therethrough.

Two opposite ends of each of the linked components 13 define locking holes (not labeled) therethrough. The linked components 13 are pivotally mounted to the corresponding first bearing pieces 112 of the first bracket 11 by fastenings fastened to the pivotal holes of the first bearing pieces 112 and the locking holes of the linked components 13.

Each of the light emitting devices 20 shows a cylindrical shape and can emit a stable light beam. Two opposite ends of the light emitting device 20 define fixing holes (not labeled). One end of the light emitting device 20 is pivotally mounted to one end of the linked component 13 by a fastening fixed to the locking hole of the linked component 13 and the fixing hole of the light emitting device 20. The other end of the light emitting device 20 is pivotally mounted to the second bracket 12 by a fastening fastened to the pivotal hole of the second piece 122 and the fixing hole of the light emitting device 20. Thereby, the light emitting devices 20 are adjustably mounted to the position device 10. In this embodiment, the light emitting devices 20 are infrared ray emitting devices, so the light beams are infrared rays.

Figure 2:
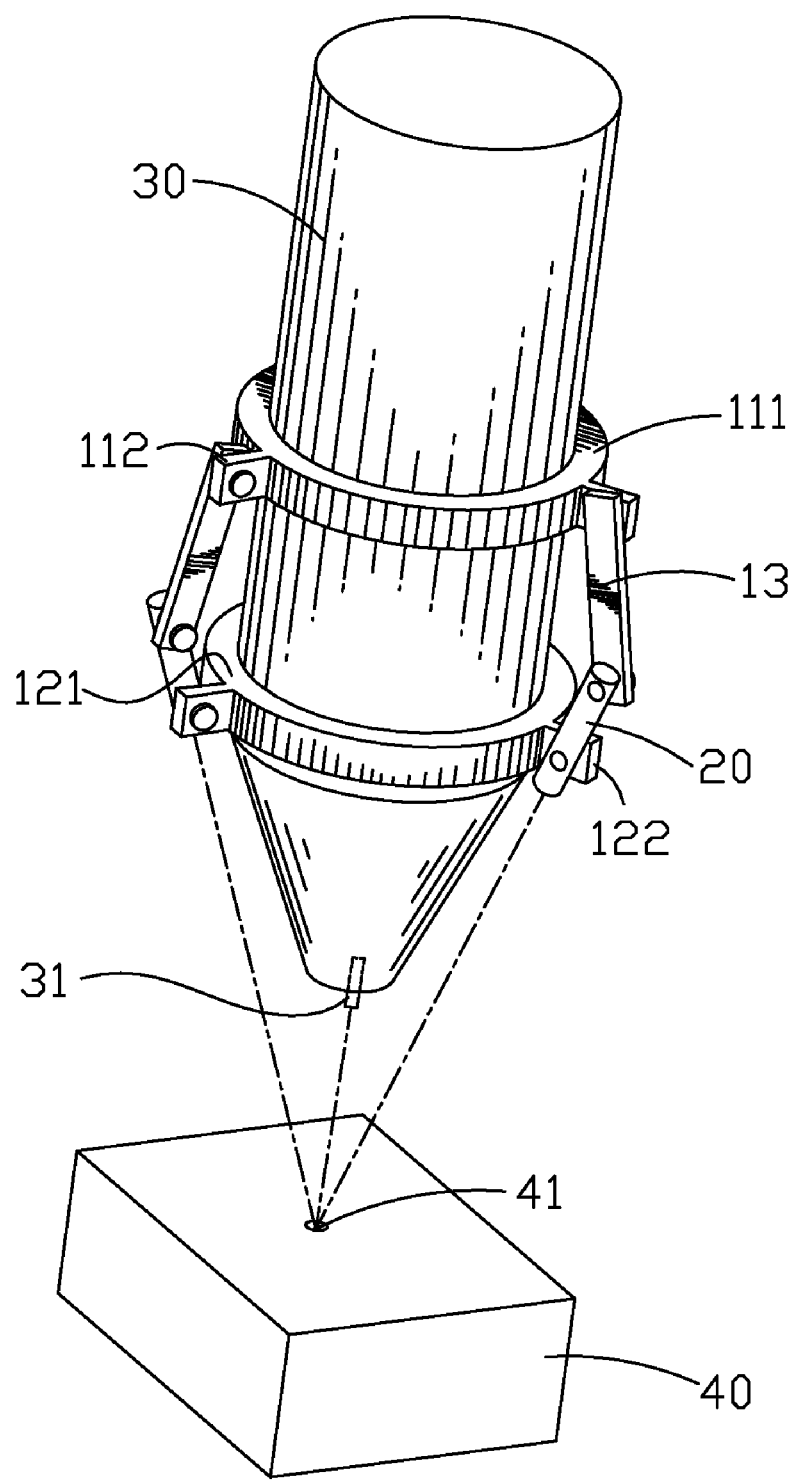
FIG. 2 is a perspective view showing the auxiliary position apparatus being mounted on a nose of an injection molding machine and an injecting hole of a mold which is placed on the injection molding machine being in alignment with a nozzle of the nose.

With reference to FIG. 2, the auxiliary position device is adapted for being mounted to an injection molding machine (not shown). The injection molding machine includes a nose 30 which has a cone-shaped end with a nozzle 31 disposed therein. A mold 40 which defines an injecting hole 41 at a middle portion thereof is placed on the injection molding machine before a product is formed. The nose 30 is encircled firmly by the first and the second fixed portions 111, 121 at intervals. The sizes and shapes of the first and the second fixed portions 111, 121 can be changed according to that of the nose 30.

To use the device, open the light emitting devices 20 simultaneously to emit light beams and then properly adjust the linked components 13 and the light emitting devices 20 to make the light beams focus a light-spot on a top surface of the mold 40. In this case, the light-spot is in alignment with the nozzle 31 of the nose 30. Then, move the mold 40 to allow the light-spot to be located at the injecting hole 41 accurately. Thus, the nozzle 31 of the nose 30 is in alignment with the injecting hole 41 precisely. Therefore ensures liquid material flows out of the nozzle 31 and into the mold 40 along the injecting hole 41 without waste.

As the above description, because the light emitting devices 20 are adjustably mounted to the position device 10, the light beams which are emitted by the light emitting devices 20 can be modulated appropriately through the linked components 13 to focus a light-spot which is in alignment with the nozzle 31 of the nose 30 on the top surface of the mold 40. By moving the mold 40 to make the light-spot located at the injecting hole 41 of the mold 40, the nozzle 31 can be adjustably in alignment with the injecting hole 41 rapidly and precisely, and therefore, it is prone to the injection molding operations.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. An auxiliary position apparatus adapted for an injection molding machine, said injection molding machine comprising a nose, the nose comprising a nozzle at an end thereof, the auxiliary position apparatus comprising:

a position device for being mounted to the nose; and at least two light emitting devices adjustably mounted to the position apparatus for emitting adjustable light beams to focus as a light-spot which is substantially in alignment with the nozzle placed on the injection molding machine.

2. The auxiliary position apparatus in claim 1, wherein the position apparatus includes a first bracket and a second bracket adapted to mounted on the nose at intervals, the position device further includes at least two linked components one end thereof pivotally mounted to the first bracket, the light emitting devices are respectively pivotally mounted to the other ends of the corresponding linked components and the second bracket.

3. The auxiliary position apparatus in claim 2, wherein the first bracket has a circular first fixed portion for being mounted on the nose, the second bracket has a circular second fixed portion corresponding to the first fixed portion and for being mounted on the nose.

4. The auxiliary position apparatus in claim 3, wherein at least two first bearing pieces extends outwardly from the first bracket, at least two second bearing pieces extends outwardly from the second bracket, the linked components are respectively pivotally mounted to the first bearing pieces, the light emitting devices are respectively pivotally mounted to the second bearing pieces.

5. The auxiliary position apparatus in claim 4, wherein the at least two first and second bearing pieces are arranged in equidistance.

6. The auxiliary position apparatus in claim 5, wherein the first bracket comprises three said first bearing pieces for respectively mounting three said linked components thereto, the second bracket comprises three said bearing pieces for respectively mounting three said light emitting devices thereto.

7. The auxiliary position apparatus in claim 3, wherein the at least two linked components and corresponding light emitting devices are mounted to the first bracket and the second bracket in equidistance.

8. The auxiliary position apparatus in claim 3, wherein the positioning apparatus includes three said linked components which are respectively pivotally connected with three said light emitting devices.

9. The auxiliary position apparatus in claim 1, wherein the light emitting devices are infrared ray emitting devices.

10. The auxiliary position apparatus in claim 1, wherein the position apparatus is made of a heat-resistant material.

11. The auxiliary position apparatus in claim 10, wherein the heat-resistant material is a ceramic.

\* \* \* \* \*